United States Patent
Gayman

(10) Patent No.: US 6,256,673 B1
(45) Date of Patent: Jul. 3, 2001

(54) CYCLIC MULTICASTING OR ASYNCHRONOUS BROADCASTING OF COMPUTER FILES

(75) Inventor: Jason A. Gayman, Rancho Cordova, CA (US)

(73) Assignee: Intel Corp., Santa Clara, CA (US)

( * ) Notice: Subject to any disclaimer, the term of this patent is extended or adjusted under 35 U.S.C. 154(b) by 0 days.

(21) Appl. No.: 09/213,220

(22) Filed: Dec. 17, 1998

(51) Int. Cl.$^7$ .................................................. G06F 15/16
(52) U.S. Cl. ........................... 709/232; 709/231; 709/200
(58) Field of Search ..................................... 709/232, 231, 709/200, 201, 203, 204

(56) References Cited

U.S. PATENT DOCUMENTS

| | | | |
|---|---|---|---|
| 5,459,725 | * 10/1995 | Bodner et al. | 370/60 |
| 5,664,091 | * 9/1997 | Keen | 714/18 |
| 5,949,789 | * 9/1999 | Davis et al. | 370/425 |

* cited by examiner

*Primary Examiner*—Ario Etienne
(74) *Attorney, Agent, or Firm*—Antonelli, Terry, Stout & Kraus, LLP

(57) ABSTRACT

A client/server network system is disclosed for cyclic multicasting of an image file from a central data provider (server) to one or more remote client machines (workstations) over a computer network with minimum network transmission while allowing any number of client machines (workstations) to download the image file at any moment in time without the need to synchronize with the central server's transmission. The network system includes a computer network; a plurality of remote client machines on the computer network; and a central server for providing a cyclic multicasting of an image file to one or more client machines over the computer network concurrently through the use of different transmission cycles of a single cyclic multicast session. An image file is asynchronously transferred from the central server to one or more remote client machines concurrently over a computer network through the use of different transmission cycles during a single cyclic multicast session so as to keep the network transmission and network bandwidth to a minimum.

32 Claims, 7 Drawing Sheets

(UNICAST)

(BROADCAST)

(MULTICAST)

(CYCLIC MULTICAST)

AN IMAGE FILE (E.G., 4 DATA PACKETS)

CYCLIC MULTICASTING OR ASYNCHRONOUS BROADCASTING OF COMPUTER FILES

TECHNICAL FILED

The present invention relates to a multicast of computer files from one central data server to one or more remote client machines (workstations) over a computer network and, more particularly, relates to cyclic multicasting of such computer files from one central data server conveniently and concurrently to one or more remote client machines (workstations) on a computer network in which any number of remote client machines can download the computer files at any time without the need to synchronize with the central data server's transmission over a computer network.

RELATED ART

Large computer files (e.g., containing programs and/or data) sometimes have to be transmitted over a computer network from a central data processing system such as a central server to a plurality of client computers. For purposes of this disclosure, an image file is defined as a copy (i.e., exact image) of a large computer file (e.g., a software application program, huge data file, etc), whereas a disk image is a copy of the entire contents of a storage device such as a floppy or hard disk, or one or more partitions of a floppy disk or a hard disk of a server or computer. The term disk image will be used in the discussions to follow, but it should be understood that such discussions apply equally as well to a generic image file. As the cost of high-capacity storage has decreased, disk images have been increasingly utilized as a means to distribute system updates over a computer network, e.g., so as to coincide a plurality of client computers on a computer network. Disk images ensure that distributed client computers are loaded with the same material.

One technique to replicate a disk image from a central or source data provider (server) to a single destination over a computer network is unicasting (discussed in greater detail ahead). A disk image is transferred from the central data provider to a single client machine at a time. If a disk image need to be transferred to multiple client machines, then replication of a disk image onto many client machines can be time consuming and bandwidth extensive. Another technique to replicate a disk image from a central data provider to multiple client machines over a computer network, while easing bandwidth and time delay problems, is broadcasting (discussed in greater detail ahead). Broadcasting involves indiscriminate delivery of information from a central data provider to all destinations over a computer network. Every client machine on a computer network can receive and process the information which has been broadcasted, despite the fact that only a small number of machines are likely to be interested in the information. Therefore, broadcasting is generally a poor solution for replicating disk images to multiple machines over a computer network.

A recent solution to replicating a disk image to multiple client machines over a computer network, while concomitantly keeping the network transmission to a minimum is multicasting (discussed in greater detail ahead). Multicasting allows only selected multiple client machines to receive the same information over a computer network simultaneously through the use of a single transmission of the information. The key difference between broadcast and multicast is that broadcast is indiscriminate about which client machines shall receive the disk image, whereas multicast attempts to deliver the disk image only to client machines that have expressed interested in receiving, or which are authorized to receive, the disk image. However, multicasting deployment requires extensive scheduling and coordinations between the central data provider and the participating client machines. In addition, there can be significant time delays between requests for a multicast session and the time a multicast session occurs. Moreover, once a multicast session is deployed, no other client machine can sign on that multicast session.

Therefore, there remains a need for replicating a large volume of data to multiple client machines over a computer network, while keeping the network transmission, distribution coordination and bandwidth to a minimum.

SUMMARY OF THE INVENTION

Accordingly, the present invention is directed to a system for providing a cyclic multicasting of an image file from a central data provider to one or more client machines over a computer network through the use of different, consecutive cycles during a cyclic multicast session with each cycle including transmission of at least a portion of the image file.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION OF THE EXEMPLARY EMBODIMENTS

Figure 1:
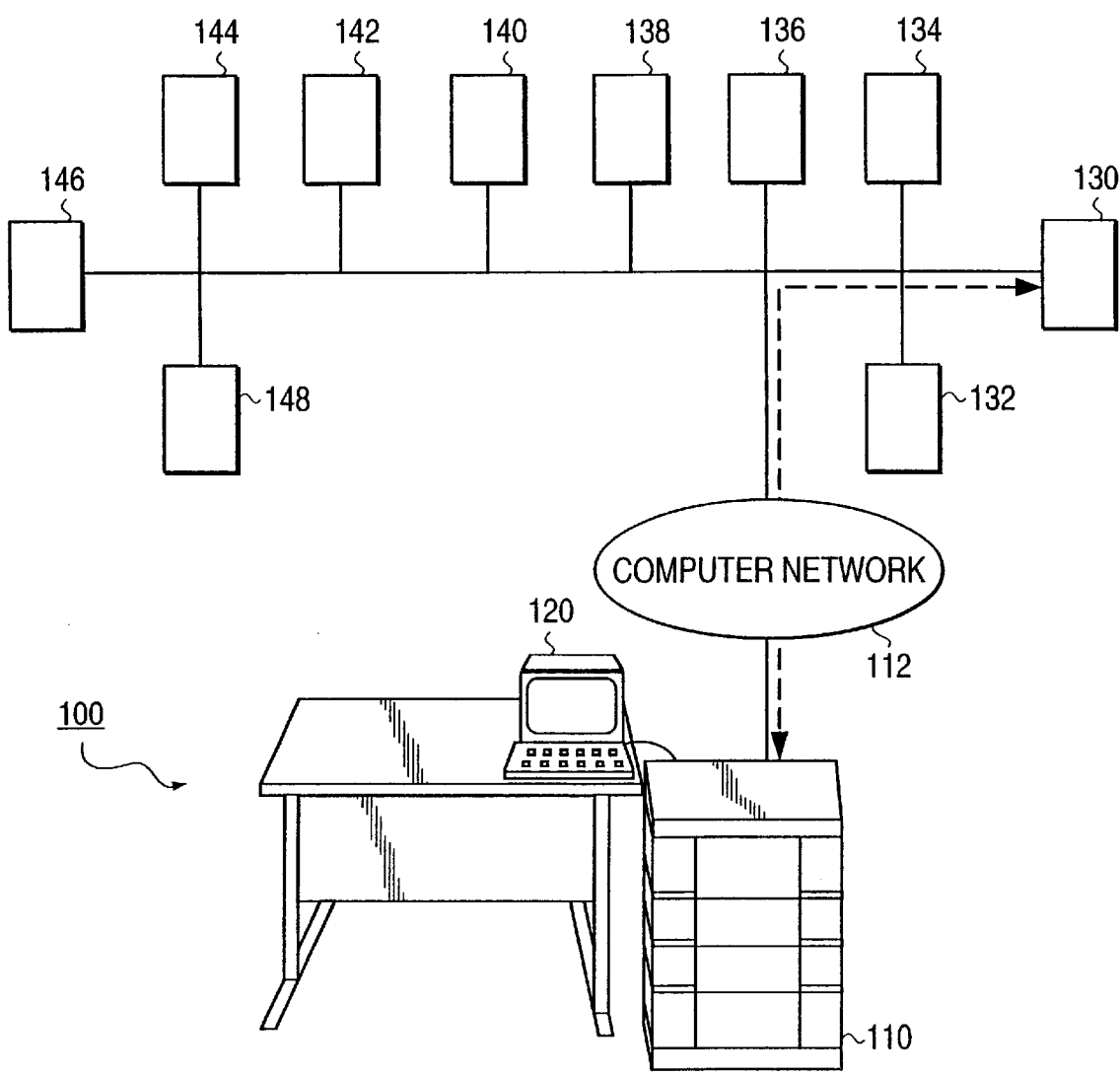
FIG. 1 illustrates an exemplary client/server network system for one-to-one transfer (unicasting) of an image file over a computer network.

Referring now the drawings, FIG. 1 illustrates an exemplary client/server network system 100 for one-to-one transfer (unicasting) of a data file (e.g., a disk image) from a central data provider to a single client machine over a computer network. For purposes of the present detailed description, a central data provider refers, but is not limited, to a central network server. Similarly, a client machine refers, but is not limited, to a remote workstation such as a personal computer on a computer network. An image file will be used as an exemplary data file which consists of a single file containing the contents of an entire disk or an entire hard drive, or one or more partitions of the disk or the hard drive. As shown in FIG. 1, the client/server network system 100 comprises a central data provider (network server) 110 which is controlled by a central computer 120, and a plurality of client machines (workstations) 130–148 via a computer network 112. The central data provider 110 and the client machines (workstations) 130–148 each contains an application program for one-to-one transfer or unicasting of an image file over a computer network. Typically, an image file is transferred from the central data server 110 to a single destination at a time. For example, if a first client machine 130 requests a transmission of an image file from the central data server 110, the central data server 110 sends out a copy of that image file to the first client machine 130 over a computer network 112. Likewise, if all ten client machines 130–148 as shown in FIG. 1, request a transmission of the image file from the central data server 110 at the same time or different times, the central data server 110 must send out ten copies of the same disk image over a computer network 112 at ten different times. The disadvantage is that unicasting requires more data to be sent across the computer network 112 as more client machines are imaged with the same image file. This not only creates more network traffic, but also slows the entire process. Moreover, the bandwidth and management overhead for keeping track of the numbers of client machines can increase significantly, since multiple copies of an image file are transferred on a limited computer network.

Figure 2:
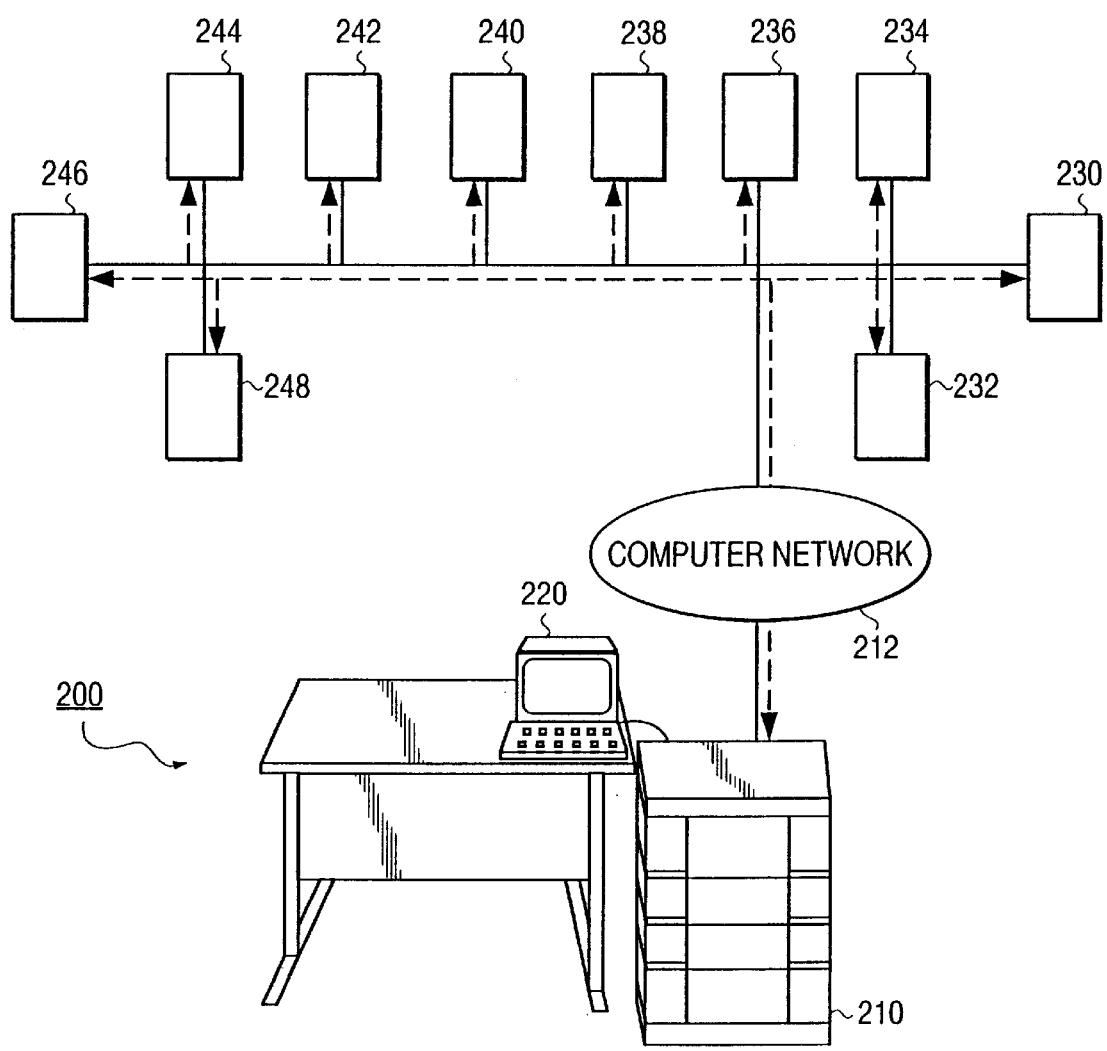
FIG. 2 illustrates an exemplary client/server network system for one-to-all transfer (broadcasting) of an image file over a computer network.

FIG. 2 illustrates an exemplary client/server network system for one-to-all transfer (broadcasting) of an image file over a computer network. The client/server network system 200 also has a central data provider (network server) 210 which is controlled by a central computer 220, and a plurality of interconnected client machines (workstations) 230–248 via a computer network 212. The central data provider 210 and client machines (workstations) 230–248 each contains an application program for one-to-all transfer or indiscriminate broadcast of an image file to all client machines (workstations) 230–248 over a computer network 212 simultaneously through the use of a single transmission of the image file. Each client machine 230–248 receives and processes the information which has been broadcasted, regardless whether the information is requested. For example, if a first client machine 130 requests a transmission of an image file from the central data server 110, the central data server 110 sends out a copy of that image file to all client machines 130–148 over a computer network 112. The disadvantage is that broadcasting does not discriminate (i.e., is not selective as to) which client machines can receive the image file, and thus particular client machines which should not be overwritten with the image file might be so mistakenly rewritten, or might mistakenly receive confidential information.

Figure 3:
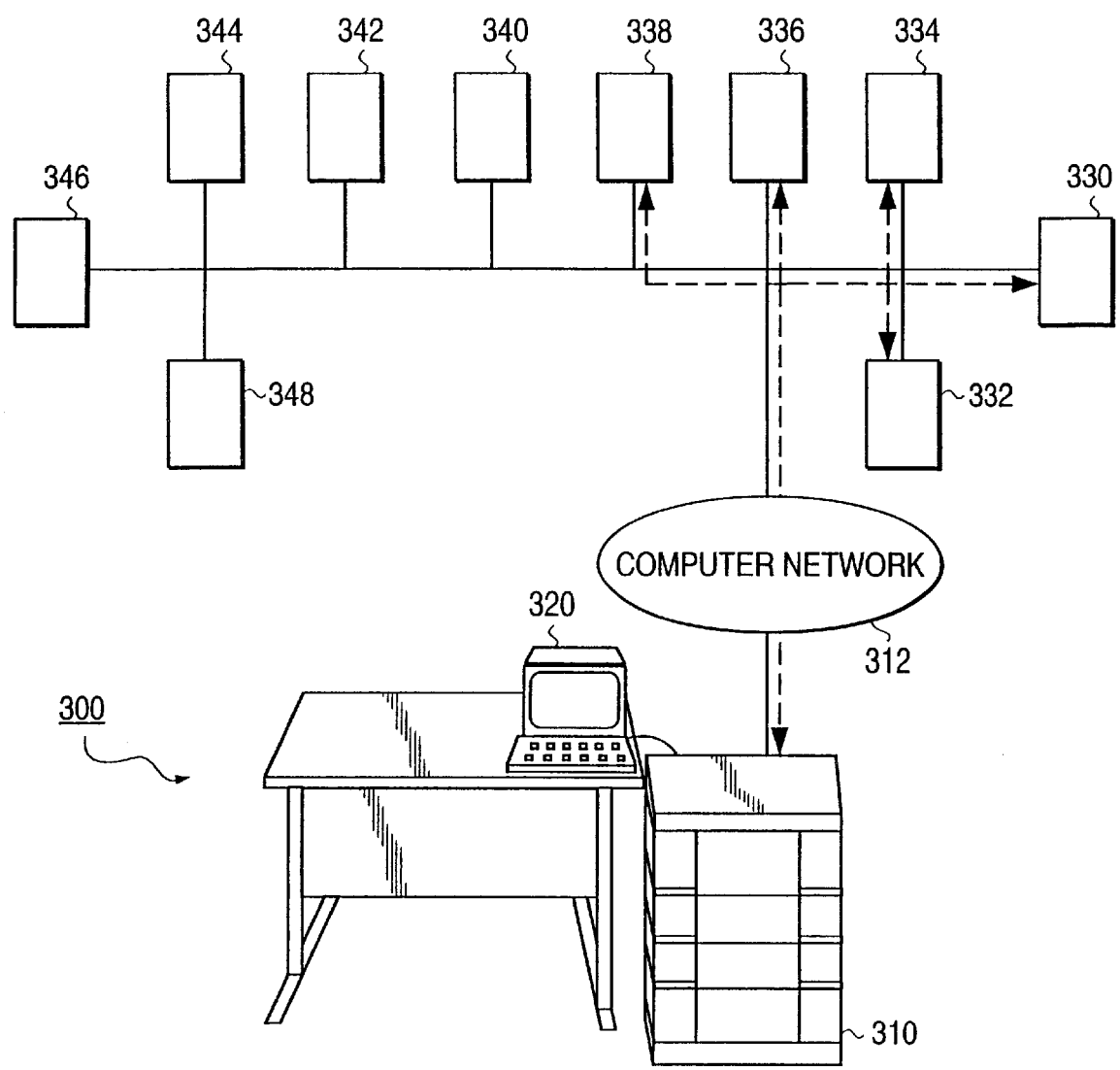
FIG. 3 illustrates an exemplary client/server network system for one-to-many transfer (multicasting) of an image file over a computer network.

FIG. 3 illustrates an exemplary client/server network system for one-to-many transfer (multicasting) of an image file over a computer network. The client/server network system 300 has a central data provider (network server) 310 which is controlled by a central computer 320, and a plurality of interconnected client machines (workstations) 330–348 via a computer network 312. The central data provider 310 and the client machines 330–348 each contains an application program for one-to-many transfer or multicasting of an image file to selected multiple client machines over a computer network 312 simultaneously through the use of a single transmission of an image file. At the central data provider 310, the multicast server application has the ability to clone disk drives/partitions, create an image file which contains the contents of the complete disk or partition image of the disk for distribution to any group of client machines 330–348 which require the identical disk or partition image. At each of the client machines 330–348, the multicast client application has the ability to receive and write the image file to the local disk drive. Using multicasting, any interested client machine must send a request to participate in a multicast session with a central data provider (server) 310 to request image delivery. Only after a specified system number of client machines (workstations) have requested a multicast session, or only occurrence or expiration of a predetermined time, does the central data provider 310 begin to send out one copy of the image file synchronously onto the computer network 312 which is picked up by every participating client machines listening to the central server's session. This way the network transmission is kept to a minimum.

For purposes of discussion, if the specified system number for a multicast deployment was set to at least five (5), then the central data provider 310 would wait until there are at least five (5) client machine requests. The central data provider 310 would then start to time synchronize with all requesting client machines over a computer network so as to send out the image file to all requesting client machines simultaneously. In other words, if the first client machine 330 signs on for a multicast session, such a client machine must wait idle until each of the second, third, fourth and fifth client machines 332–338 has signed on for a multicast session. Only after the fifth client machine 338 has signed on for a multicast deployment, does the central data provider 310 begin to time synchronize with all five participating client machines 330–338 on a computer network 312 so as to send out the image file to all five (5) client machines 330–338 simultaneously. As a result, there are a great deal of coordinations between the central data provider (server) 310 and participating client machines (workstations) 330–348 for a multicasting deployment. In addition, if a client happens to be a first request for a multicast session, then such a client must wait idle for a long time until all other four client machines (workstations) submit requests before the central data provider (server) can synchronously transfer an image file to all participating client machines (workstations). The inherent time delay (dead time) for multicasting deployment is, therefore, extremely inconvenient and burdensome for clients in their attempt to transfer an image file to/from the server. Moreover, once a multicast session is deployed, no other client machine can sign on that multicast session.

Figure 4:
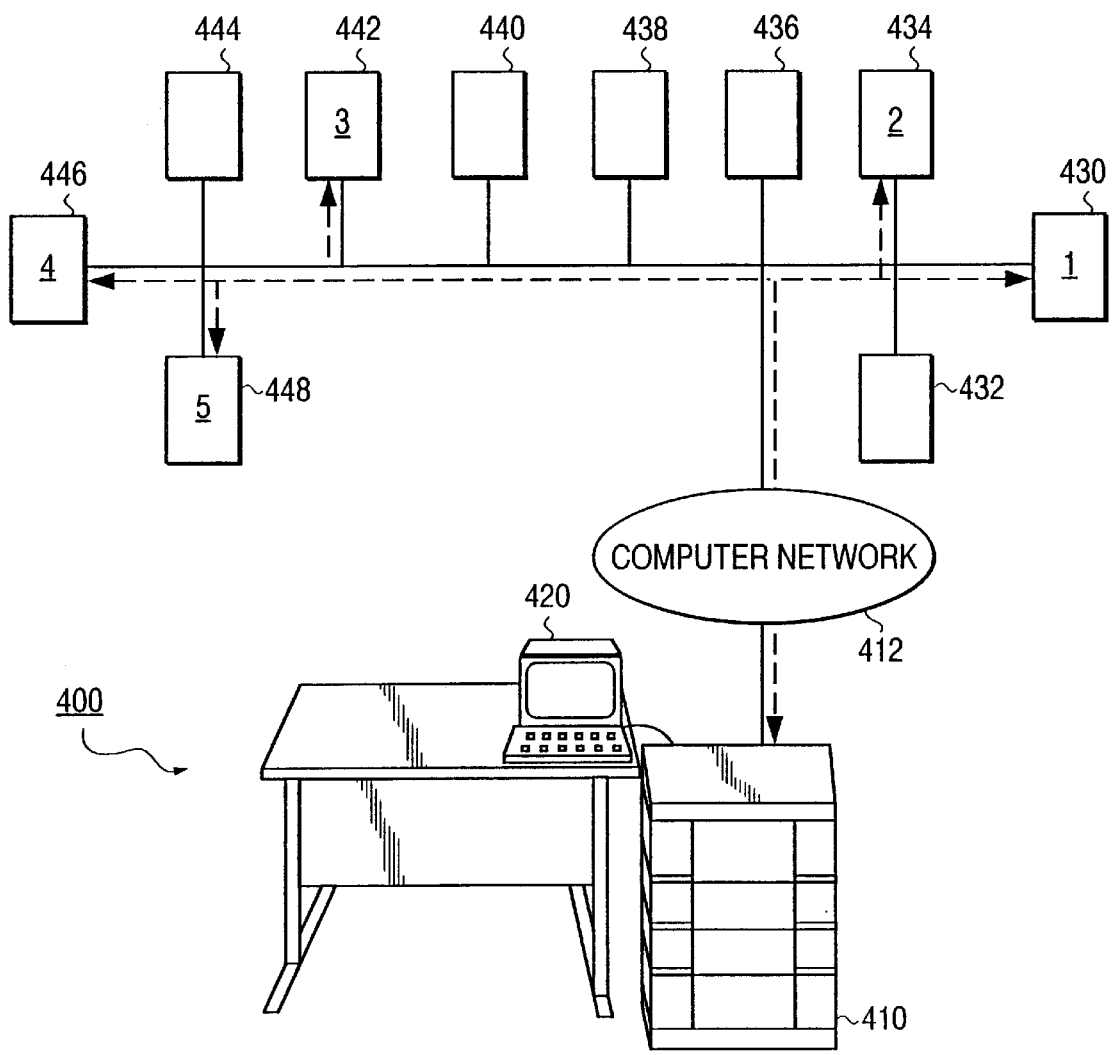
FIG. 4 illustrates a client/server network system for an exemplary cyclic multicasting of an image file over a computer network with minimum network transmission according to an embodiment of the present invention.

Discussion turns now to FIG. 4 which illustrates an exemplary client/server network system for an exemplary cyclic multicasting of an image file over a computer network with minimum network transmission according to the principles of the present invention. Cyclic multicasting was conceived to embrace the best of the one-to-many (multicasting) transfer approach in which the network traffic and network transmission are kept to the minimum, while allowing the client machines (workstations) connected to a computer network to operate at their own time. Workstations as discussed in the present disclosure is intended to include personal computers (PCs) and local servers, but are not limited to the same. Cyclic multicasting refers to the sending of an image file in a cyclic manner in as many repetitive transmissions as required during a cyclic multicast session so that all participating client machines (workstations) can download the same image file either simultaneously, sequentially, or in an overlapping manner. In order words, cyclic multicasting is an idea whereby transmission is attempted to be minimized, while any client machine can download an image file at any moment in time without the need to synchronize with the server's transmission. This is permitted because an image file is a single file that contains the contents of an entire disk, or selected partitions of the entire disk, and can be transmitted or received in terms of packets of data in no particular order.

Figure 7:
FIG. 7 illustrates an exemplary image file divided into, for example, four discrete data packets.

In an exemplary embodiment of the present invention, segments of an image file (e.g., data packets as shown in FIG. 7) can be transmitted to a designated client machine over a computer network in any order so that a participating client machine which requests an image file partway through a transmission can immediately pick up segments (e.g., data packets) where the transmission currently is during a current cycle, and download to the end of that image file, and then pick up the remaining segments of the image file when the image is repeated (either as a whole or partial image) during a subsequent retransmission operation forming part of the same cyclic multicasting session. The same is true for each subsequent client machine which requests an image file during a cyclic multicast session. In the exemplary embodiment, an identifier string and disk location are encoded (e.g., in a header, not shown) in each transmission sent from the central data provider (server). Such identifier string and disk location can be used by clients to identify a received packet and/or determine such packet's sequence location within an overall disk image transmission.

As shown in FIG. 4, the exemplary client/server network system for an exemplary cyclic multicasting according to the present invention includes similar hardware components as that of multicasting such as a central data provider (network server) 410 which is controlled by a central computer 420, and a plurality of remote client machines (workstations) 430–448 connected to a computer network 412. The central data provider 410 and the client machines 430–448 each contains an application program for cyclic multicasting of an image file to selected multiple client machines over a computer network 412 simultaneously through the use of a minimum number of repetitive transmissions of the image file during a cyclic multicast session. The computer network 412 can typically be a local area network (LAN) or a broadband network that uses either Ethernet, or Token Ring technology standards. Asynchronous Transfer Mode (ATM), Fiber Distributed Data Interface (FDDI), and, on the broader bandwidth scale, Fast and Gigabit Ethernet technology may also be used for sending out an image file from a central data provider 410 to any one of remote client machines 430–448.

At the central data provider 410, a cyclic multicast server application program is provided for cyclic multicasting of an image file to multiple remote client machines over a computer network 412 simultaneously through the use of minimum cyclic transmissions, while eliminating the time delay (dead time) inherent to multicasting deployment and concurrently permitting any number of client machines to download the image file at any moment in time without simultaneous synchronization with the central data provider (server) 410. As intended, the cyclic multicast server application also has the ability to clone disk drives/partitions, create an image file which contains the contents of the complete disk or partition image of the disk for distribution to a group of similar client machines 430–448 which require the identical disk or partition image. In a cyclic multicast mode, depending on the number of participating client machines, an image file may be sent with minimum repetitive cycles to the participating client machines during a single cyclic multicast session. This way the transmission is kept to a minimum and the transmission bandwidth is minimized.

At each remote client machine 430–448 on a computer network 312, a cyclic multicast client application program is provided to allow for requesting a cyclic multicasting of an image file from a central data provider (server) 410 and for receiving an image file at any moment in time. In a cyclic multicast mode, any number of remote client machines 430–448 can download the image file transmitted from the central data provider (server) 410 either simultaneously, sequentially, or in an overlapping manner during a cyclic multicast session. In addition, the multicast client application also has the ability to receive and write the image file to the local disk drive. Using cyclic multicasting, each of the remote client machines 430–448 signs on the cyclic multicast session with the central data provider (server) 410 at any time to request for image delivery.

For example, as shown in FIG. 4, if a first client machine 430 from all remote client machines 430–448 on a computer network 412 signs on a cyclic multicast session and requests for a selected image file (FIG. 7) from a central data provider (server) 410, the central data provider (server) 410 immediately multicasts (sends) a copy of the selected image file to the first client machine 430 requesting for the cyclic multicast session over a computer network 412. During transmission of this multicast copy of the selected image file to the first client machine 430, any other client machines can download portions of the image file partway through the transmission. That is, if one or more client machines such as second, third, fourth and fifth client machines 434, 442, 446 and 448, express a desire to download the image file, either simultaneously, sequentially, or in an overlapping manner, while the image file is still being downloaded to the first client machine 430, all the client machine has to do is to sign on the cyclic multicast session, and then to immediately begin to download portions of the image file partway through a current transmission cycle of the cyclic multicast session. When the central data provider (server) 410 recognizes that another client machine such as the second client machine 434 has joined the cyclic multicast session and has missed downloading portions of the image file (discussed in greater detail ahead in FIG. 8), the image file is sent again (i.e., cyclic retransmitted) during a following, next cycle of the same cyclic multicast session so that the network transmission is kept to a minimum.

In another exemplary embodiment of the present invention (discussed in greater detail ahead in FIG. 9), only segments of the image file that were not downloaded to the second client machine 434 are sent from the central data provider (server) 410 during a next cycle of the same cyclic multicast session. This way the image file is recycled in the same cyclic multicast session to all participating client machines in order to eliminate the inherent time delay (dead time) for multicasting deployment. Moreover, there is no need to coordinate for synchronous transfers of an image file between the central data provider (server) 410 and the remote client machines 430–448. Furthermore, there is no time delay for a remote client machine 430–448 to download an image file from a central data provider (server) 410.

Figure 5:
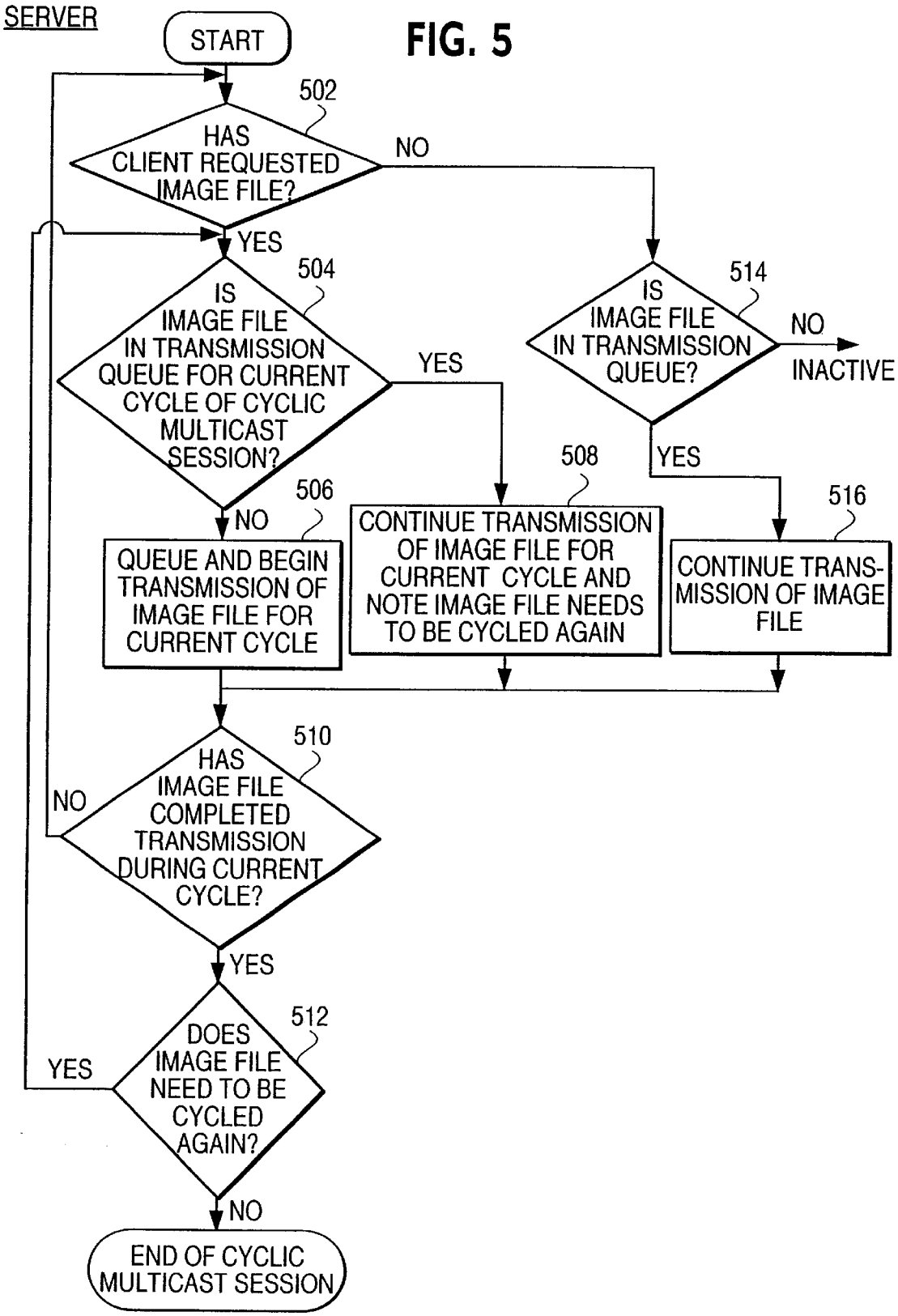
FIG. 5 illustrates a flowchart of an exemplary cyclic multicasting method for asynchronous transfers of a data file from a central data provider to one or more client machines over a computer network with minimum network transmission according to an embodiment of the present invention.

FIG. 5 illustrates an exemplary cyclic multicasting method for asynchronous transfers of an image file from a central data provider (server) 410 to one or more client machines (workstations) 430–448 over a computer network 412 with minimum network transmission according to an embodiment of the present invention. The cyclic multicasting method is performed by a multicast application program of the central data provider (server) 410 as shown in FIG. 4, and is implemented by an algorithm which may be written in simple program languages included in the non-exhaustive list of BASIC, PASCAL, COBOL, C and C++ as listed hereinbelow.

```
Server:
loop through all images {
    Has a client requested imageX?
    Yes:
        Is imageX in the transmission queue?
        Yes:
            Continue transmitting and note image needs to be cycled again.
        No:
            Start transimission of imageX
    No:
        Is imageX in the transmission queue?
        Yes:
            Continue transmitting
        No:
            Do nothing
    Has imageX finished transmitting current cycle?
    Yes:
        If image needs to be cycled again, restart.
    No:
        Continue transmission if necessary.
```

As shown in FIG. 5, the cyclic multicasting method for asynchronous transfers of an image file is implemented by the following steps. First, the central data provider (server) 410 determines whether any new client machine, such as a first client machine 430 from all client machines 430–448 on a computer network 412 has signed on a cyclic multicast session and requested for an image file at step 502. If a new client machine has requested for an image file, the central data provider (server) 410 determines whether an image file is in a transmission queue for a current cycle of a cyclic multicast session at step 504. If the image file is not in the transmission queue for the current cycle of the cyclic multicast session, the central data provider (server) 410 queues a new cyclic transmission of an image file and begins transmission of the image file for the current cycle at step 506. However, if the image file is in the transmission queue for the current cycle, the central data provider (server) 410 continues transmission of the image file for the current cycle and notes (i.e., flags) that the image file needs to be cycled again at step 508, that is, whether the image file needs to be transmitted at a next cycle of the same cyclic multicast session. The image file needs to be cycled again if, during transmission of the image file to the first client machine 430, another client machine such as a second, third, fourth and fifth client machines 434, 442, 446 and 448 or any other number of client machines, either simultaneously, sequentially, or in an overlapping manner, desires to download the image file from the central data provider (server) 410, but is unable to download the entire image file during the current transmission cycle.

Afterwards, the central data provider (server) 410 determines whether the transmission of the image file has completed during a current cycle at step 510. If the transmission of the image file has not completed during the current cycle, the central data provider (server) 410 returns to step 502 to determine whether any new client machine has requested for an image file. However, if the transmission of the image file has completed during the current cycle, the central data provider (server) 410 questions (i.e., checks a flag) whether the image file needs to be cycled again at step 512. If the image file needs to be cycled again, the central data provider (server) 410 returns to step 504 for transmission of the same image file at a next cycle via step 506. Otherwise, the central data provider (server) 410 terminates the cyclic multicast session.

If the client machine has not requested for an image file at step 502, however, the central data provider (server) 410 determines whether the image file is in a transmission queue for a current cycle at step 514. If the image file is not in the transmission queue for the current cycle, the cyclic multicasting function of central data provider (server) 410 is presently inactive. However, if the image file is in the transmission queue for the current cycle at step 516, the central data provider (server) 410 continues transmission of the image file for the current cycle and proceeds to step 510.

Figure 6:
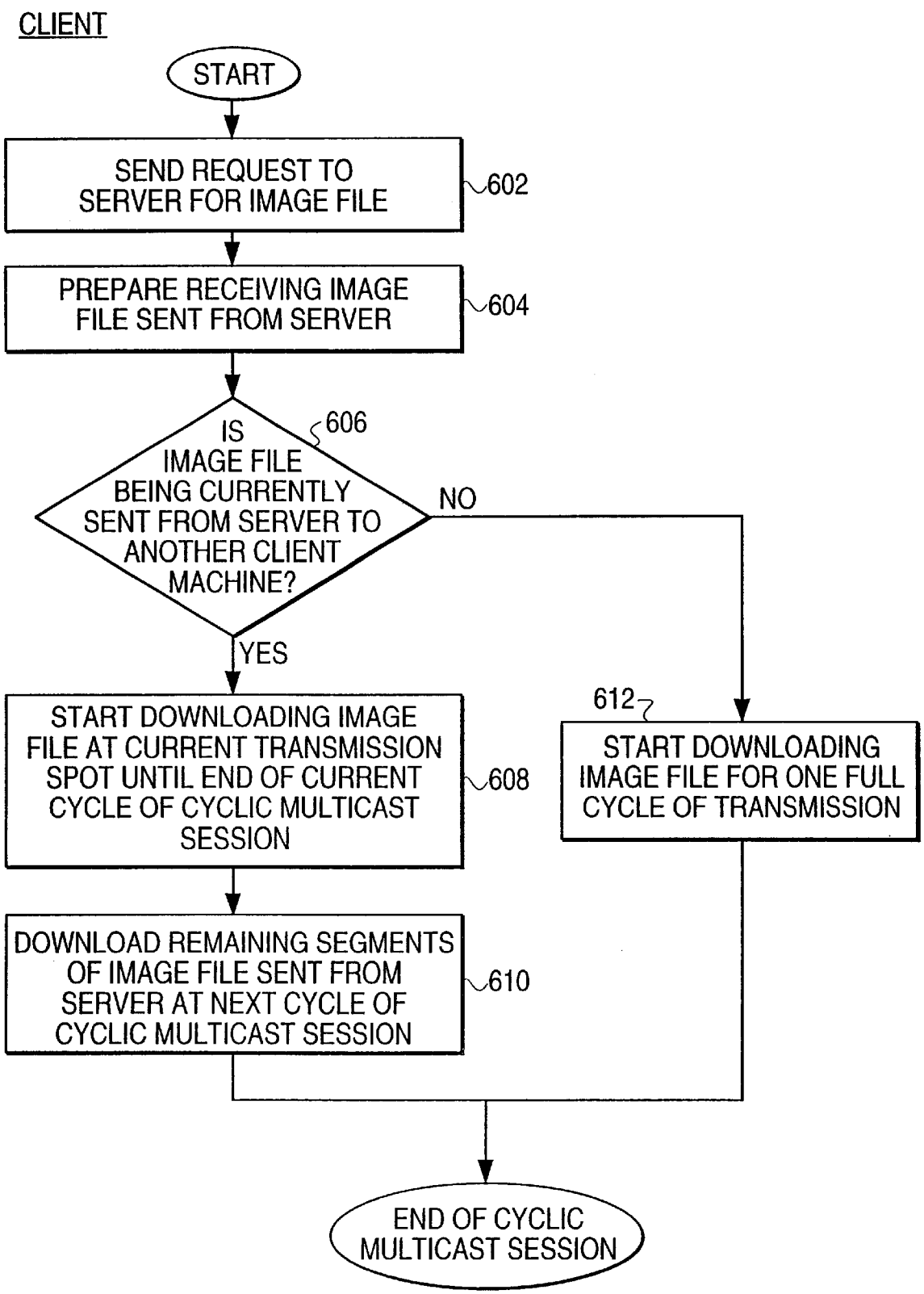
FIG. 6 illustrates a flowchart of an exemplary cyclic requesting method for requesting cyclic multicasting of an image file from one or more client machines connected to a computer network according to an embodiment of the present invention.

FIG. 6 illustrates a cyclic image requesting method for requesting cyclic multicasting of an image file from one or more client machines (workstations) connected to a computer network according to an embodiment of the present invention. The cyclic image requesting method is performed by the multicast client application program of each remote client machine 430–448 as shown in FIG. 4, and is implemented by an algorithm which may be written in simple program languages included in the non-exhaustive list of BASIC, PASCAL, COBOL, C and C++ as listed hereinbelow.

```
ClientneedingimageX: {
    Send request to server for imageX even if it is being transmitted . . .
    Is ImageX being currently transmitted?
    Yes:
        Start downloading imageX at current transmission spot
        (Transmission must include disk information to allow random
        start locations)
        Continue to end of cycle
        Start next cycle
        Finish at point before the starting point.
    No:
        Start downloading one full cycle
```

As shown in FIG. 6, the cyclic image requesting method for asynchronous transfers of an image file is implemented by the following steps. At the start, a client machine 430–448 on a computer network 412 signs on a cyclic multicast session with the central data provider (server) 410 at any time and sends request to the central data provider (server) 410 for an image file at step 602. After the request for an image file is sent to the central data provider (server) 410, the client machine prepares to receive the image file sent from the central data provider (server) 410 at step 604. The client machine then determines whether the image file is being currently sent from the central data provider (server) 410 to another client machine on the computer network 412 at step 606. If the image file is being currently sent from the central data provider (server) 410 to another client machine, then the client machine starts downloading segments (e.g., data packets) of the image file at a current transmission spot until the end of the current cycle of the cyclic multicast session at step 608. Next, the client machine downloads the remaining segments (e.g., data packets) of the image file which is sent from the central data provider (server) 410 at a next cycle of the cyclic multicast session at step 610.

Otherwise, if the image file is not being currently sent from the central data provider (server) 410 to another client machine, then the client machine starts downloading the image file for one full transmission cycle of the cyclic multicast session at step 612. In a cyclic multicast mode, any number of remote client machines 430–448 can request for an image file at any time and then download the image file transmitted from the central data provider (server) 410, either simultaneously, sequentially, or in an overlapping manner during a cyclic multicast session without the inherent time delay (dead time) for multicasting.

FIG. 7 illustrates an exemplary image file divided into, for example, four data packets. In practice, an image file can be composed of, hundred of thousands, or millions of data packets depending on the size of each data packet and the size of an image file. However, for the sake of simplicity, each image file can be divided into, for example, four different data packets each representing a discrete segment of an image file.

Figure 8:
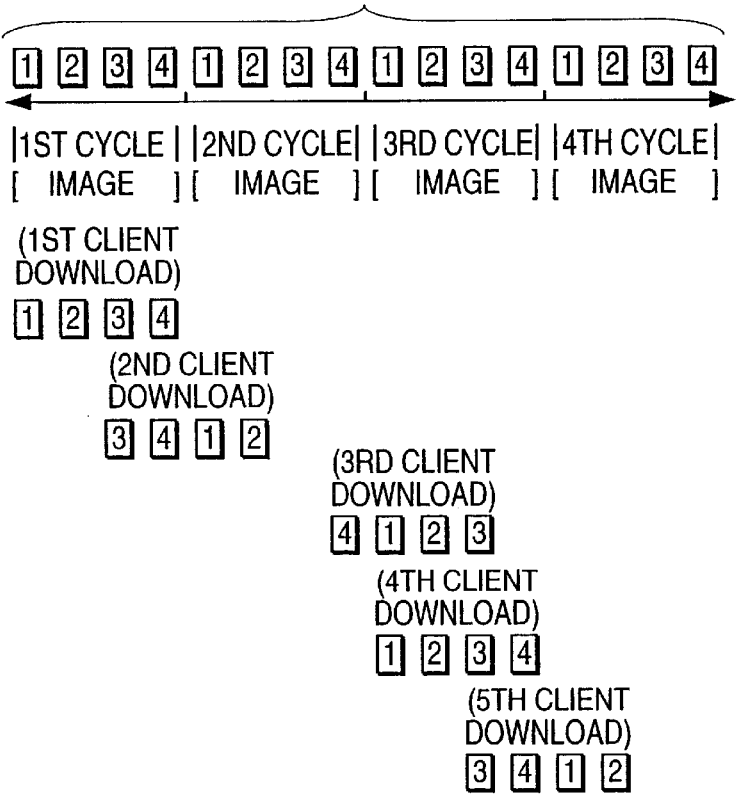
FIG. 8 illustrates an exemplary pictorial representation of one exemplary cyclic multicasting of an image file from a central data provider to one or more client machines during a single cyclic multicast session while keeping minimal network traffic according to an embodiment of the present invention.

Turning now to FIG. 8 which illustrates a pictorial representation of one exemplary cyclic multicasting of an image file from a central data provider (server) to one or more client machines (workstations) during a cyclic multicast session while keeping minimal network traffic according to an embodiment of the present invention. An image file comprised of, for example, four (4) data packets as set forth in FIG. 7 is used to describe the exemplary cyclic multicasting session. After a first client machine 430 as shown in FIG. 4 signs on a cyclic multicast session with the central data provider (server) 410 and requests for a selected image file from the central data provider (server) 410, the central data provider 410 sends out an image file selected via data packets 1–4 the computer network 412 during a first cycle of the cyclic multicast session. The first client machine 430 then downloads the data packets 1–4 of the image file during the first cycle. It should be noted here that more than one client machine can simultaneously sign on the cyclic multicast session with the central data provider (server) 410 and request for the same image file to be download concurrently. However, for purposes of discussion, only a single client machine requests for an image file at a time as illustrated in this pictorial representation.

During the first cycle of the cyclic multicast session, if a second client machine 434 signs on the cyclic multicast session partway through the cycle (e.g., after data packets 1–2 have already sent) and requests for the image file, the central data provider (server) 410 knows from a time of receipt of the request, that the second client machine 434 had not received the previously transmitted data packets (e.g., data packets 1–2), and internally notes or flags that it must resend a full image file (e.g., data packets 1–4) at a next, or second cycle of the cyclic multicast session. Accordingly, the second client machine 434 will receive data packets 3–4 during the first image transmission cycle, and will receive the missing data packets 1–2 during the next image transmission cycle. Similarly, if during the second cycle of the cyclic multicast session, a third client machine 442 and a fourth client machine 446 sequentially sign on the cyclic multicast session partway through the second cycle and request for the copy of the same image file, the central data provider (server) 410 again resends a full image file (e.g., data packets 1–4) to allow both the third and fourth client machines 442 and 446 to capture any missing data packets at a following, or third image transmission cycle.

In other words, the central data provider (server) 410 knows from the different time of requests, that neither the third client machine 442 nor the fourth client machine 446 received the previously transmitted data packets (e.g., data packets 1–3 for the third client machine 442 and data packets 1–4 for the fourth client machine 446), and internally notes or flags that it must resend a full image file at a next, or third image transmission cycle of the cyclic multicast session. Accordingly, the third client machine 434 will download data packet 4 during the second image transmission cycle, and will download the missing data packets 1–3 during the third image transmission cycle. However, the fourth client machine 446 having requested too late for downloading even data packet 4 during the second image transmission cycle, will download all of the data packets 1–4 during the third image transmission cycle. Lastly, if during the third image transmission cycle of the cyclic multicast session, a fifth client machine 448 signs on the cyclic multicast session partway through the third image transmission cycle and requests for the same copy of the image file, the central data provider (server) 410 then resends a full image file for a following, fourth image transmission cycle.

Since the copies of the same image file are sent sequentially in consecutive transmission cycles of the same cyclic multicast session, the network transmission is kept to a minimum. More particularly, whereas unicasting would have taken five full image transmission sessions to unicast the image file to each of the five requesting machines, FIG. 8 is illustrative that cyclic multicasting of the present invention is advantageous over unicasting in requiring only a single transmission session in lesser number of consecutive transmission cycles, i.e., less transmission time. Further, cyclic multicasting of the present invention is advantageous over broadcasting in that selective transmission to specific clients can be made. Finally, cyclic multicasting of the present invention is advantageous over regular multicasting in that any client machine can request and conveniently download an image file at any time without the inherent time delay (dead time) for multicasting.

Figure 9:
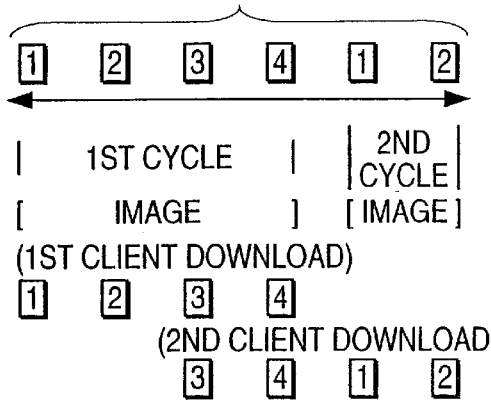
FIG. 9 illustrates an exemplary pictorial representation of another exemplary cyclic multicasting of a data file from a central data provider to one or more client during different cyclic multicast sessions while keeping minimal network traffic according to an embodiment of the present invention.
Figure 9:
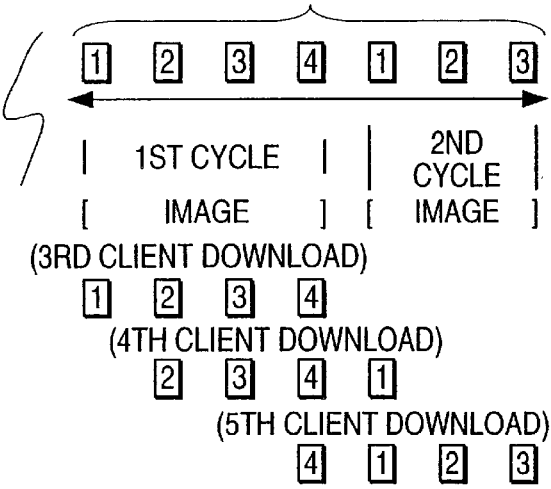

Likewise, FIG. 9 illustrates an exemplary pictorial representation of another exemplary cyclic multicasting of an image file from a central data provider (server) to one or more client (workstations) during different cyclic multicast sessions while keeping minimal network traffic according to the principles of the present invention. In this exemplary embodiment, only missing segments (e.g., data packets) of a full image file are sent during subsequent image transmission cycles if the second client machine 434 signs on a cyclic multicast session during the transmission of an image file to the first client machine 430. In other words, only segments (e.g., data packets) of a full image file that were not downloaded to the second client machine 434 are resent from the central data provider (server) 410 during the next image transmission cycle of the same cyclic multicast session. To discuss just one example from FIG. 9, only data packets 1–2 as set forth in FIG. 7 are retransmitted during the second cycle of the first cyclic multicast session, i.e., as only such data packets 1–2 are needed by the second client machine 434 to complete its image file. Data packets 3–4 are not retransmitted during the second cycle of the first cyclic multicast session as they are not needed by the second client machine 434. This way not only the transmission is kept to a minimum, but the transmission bandwidth and network traffic are minimized because only missing segments (e.g., missing data packets) of the image file are sent to the next client machine in a much shorter cycle of transmission. In addition, as intended, segments of an image file can be transmitted to a designated client machine over a computer network 412 in any order so that the designated client machine which requests an image file partway through a transmission can immediately pick up where the transmission currently is during a current cycle, and download to the end of that image file, and then pick up the remaining segments of the image file when the image is repeated a second time during a second cycle.

After the missing segments (e.g., data packets) of a full image file are sent to the second client machine 434 over a computer network 412, the central data provider (server) 410 determines whether there is any more client machine from all client machines 430–448 on a computer network 412 listening on the cyclic multicast session. When there is no client machine listening on the cyclic multicast session, the cyclic multicast session is terminated. After the cyclic multicast session is terminated, if other clients such as a third client machine 442 signs on for another cyclic multicast session as shown in FIG. 9, the central data provider (server) 410 restarts another, second cyclic multicast session and resends a full image file to the third client machines 442 at a following, or new first cycle. Likewise, if during the first cycle of the second cyclic multicast session, a fourth client machine 446 and a fifth client machine 448 sequentially sign on the second cyclic multicast session partway through the first cycle of the second cyclic multicast session and request for the image file, the central data provider (server) 410 then resends only missing segments (e.g., data packets) of an image file that were not downloaded by the fourth and fifth client machines 446 and 448. For example, only data packets 1–3 are retransmitted during the second cycle of the second cyclic multicast session. This is because not only data packet 1 is needed by the fourth client machine 446 but data packets 1–3 are needed by the fifth client machine 448 to complete its image file. Consequently, these missing data packets of an image file can be sent to the fourth and fifth client machines 446 and 448 in a much shorter cycle of transmission. Again, since the copies of the image file are sent sequentially in different, consecutive transmission cycles of the same cyclic multicast session, the network transmission is kept to a minimum. According to the present invention, coordinations for synchronous transfers of an image file between the central data provider (server) 410 and remote client machines 430–448 are no longer required, and the time delay for a remote client machine 430–448 to download an image file from a central data provider (server) 410 is eliminated. It should be noted here that while the present invention describes transmission of a single image, multiple images can also be sent concurrently from a central data provider (server) over a computer network to many client machines (workstations) using a cyclic multicasting deployment in either a single cyclic multicast session or multiple cyclic multicast sessions.

As described from the foregoing, the present invention advantageously provides a cyclic multicasting of an image file from a central data provider (server) to one or more client machines (workstations) over a computer network with minimum network transmission while allowing any number of client machines (workstations) to download the image file at any time without the need to synchronize with the beginning of the file transmission of the central data provider (server). In particular, cyclic multicasting permits a remote workstation to perform validations by incorporating many disks which are transferred from the central server as often as needed. System updates over a computer network also become significantly less time consuming.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. In addition, many modifications may be made to adapt a particular situation to the teachings of the present invention without departing from the central scope thereof. Therefore, it is intended that the present invention not be limited to the particular exemplary embodiment disclosed, but that the present invention includes all embodiments falling within the scope of the appended claims.

What is claimed is:

1. A system which provides a cyclic multicasting of an image file to one or more client machines over a data network concurrently through the use of different, consecutive cycles of a single cyclic multicast session, with each cycle including transmission of at least a portion of said image file, wherein said cyclic multicasting of said image file to one or more client machines over said data network during said single cyclic multicast session is provided by:

determining whether a first client machine needs transmission of the image file over said data network;

when the first client machine needs transmission of the image file over said data network, determining whether the image file is in a transmission queue during a first transmission cycle of said single cyclic multicast session;

when the image file is in the transmission queue during said first transmission cycle, sending the image file to the first client machine over said data network during said first transmission cycle and determining whether a second client machine needs transmission of the image file during said first transmission cycle over said data network;

when the second client machine needs transmission of the image file over said data network, determining whether the sending of the image file to the first client machine over said data network is completed during said first transmission cycle of said single cyclic multicast session; and when the sending of the image file to the first client machine over said data network is completed during said first transmission cycle, resending at least a portion of the image file to the second client machine over said data network during a next, second transmission cycle of said single cyclic multicast session.

2. A system of claim 1, wherein said image file is transmitted sequentially to different client machines over a data network in said different, consecutive cycles of said single cyclic multicast session so as to keep network transmission and network bandwidth to a minimum.

3. A system of claim 1, further comprising a cyclic multicast application program for performing said cyclic multicasting of said image file to one or more client machines over a data network by sending a copy of said image file to different client machines over said data network in different, consecutive cycles during said single cyclic multicast session.

4. A system of claim 1, wherein said cyclic multicasting of said image file to one or more client machines over said data network is terminated after the image file has been sent, when another client machine has not signed on during the first cycle of said cyclic multicast session.

5. A system of claim 4, wherein said image file contains the contents of one of a floppy disk, a hard disk, and at least one logical partition of one of said floppy disk and said hard disk.

6. A system of claim 4, wherein said image file contains a computer file representing one of a software program and a system update information for system update over said data network.

7. A system of claim 4, wherein each client machine corresponds to one of a remote workstation, and a remote personal computer connected to said data network.

8. A system of claim 4, wherein said image file contains a plurality of data packets each representing a discrete segment of the contents of one of a floppy disk, a hard disk, and at least one logical partition of one of said floppy disk and said hard disk.

9. A system of claim 4, wherein said first client machine is permitted to immediately download a full image file sent during said first transmission cycle of said single cyclic multicast session, while sending the image file to the first client machine over said data network.

10. A system of claim 4, wherein said second client machine is permitted to immediately download at least a portion of a full image file sent during said first transmission cycle, and download any missing portion of said full image file during said next, second transmission cycle of said single cyclic multicast session.

11. A cyclic multicasting method for asynchronous transfers of an image file from a central server to one or more client machines over a computer network, comprising the steps of:

determining whether a first client machine needs a cyclic multicast session and transmission of an image file over said computer network;

when the first client machine needs transmission of the image file over said computer network, determining whether the image file is in a transmission queue;

when the image file is in the transmission queue, sending the image file to the first client machine over said computer network during the current cycle and determining whether a second client machine needs transmission of the image file during the current cycle over said computer network;

when the second client machine needs transmission of the image file during the current cycle, determining whether the sending of the image file to the first client machine over said computer network is completed during the current cycle of said cyclic multicast session; and when the sending of the image file to the first client machine over said computer network is completed during the current cycle, resending at least missing portions of the image file to the second client machine over said computer network during a next cycle of said cyclic multicast session.

12. The cyclic multicasting method of claim 11, wherein said image file contains the contents of one of a floppy disk, a hard disk, and at least one logical partition of one of said floppy disk and said hard disk of said central server.

13. The cyclic multicasting method of claim 11, wherein said image file contains a computer file representing one of a software program and a system update information for system update over said computer network.

14. The cyclic multicasting method of claim 11, wherein each client machine corresponds to one of a remote workstation, and a remote personal computer connected to said data network.

15. The cyclic multicasting method of claim 11, wherein said image file contains a plurality of data packets each representing a discrete segment of the contents of one of a floppy disk, a hard disk, and at least one logical partition of said floppy disk or said hard disk.

16. The cyclic multicasting method of claim 15, further comprising a step of enabling the first client machine to immediately download a full image file which is sent from the central server during the current cycle of said cyclic multicast session.

17. The cyclic multicasting method of claim 16, further comprising a step of enabling the second client machine to immediately download the full image file which is sent from the central server during the next cycle of said cyclic multicast session.

18. A method of asynchronously transferring an image file from a data provider to one or more client machines connected to a computer network during a cyclic multicast session, said method comprising the steps of:

determining whether a first client machine needs said cyclic multicast session with the data provider for delivery of an image file;

if said cyclic multicast session is needed by the first client machine, sending the image file from the data provider to the first client machine during a first cycle of said cyclic multicast session for downloading via said computer network;

enabling the first client machine to download the image file sent from the data provider via said computer network during the first cycle of said cyclic multicast session;

while the first client machine is downloading the image file during the first cycle of said cyclic multicast session, determining whether a second client machine needs said cyclic multicast session for delivery of said image file from the data provider;

if said cyclic multicast session is needed by the second client machine while the first client machine is downloading the image file during the first cycle of said cyclic multicast session, enabling the second client machine to download at least a portion of the image file at a current transmission spot during the first cycle of said cyclic multicast session;

sending at least missing portions of the image file from the data provider to the second client machine during a next cycle of said cyclic multicast session for downloading via said computer network; and enabling the second client machine to download said at least missing portions of the image file which preceded the current transmission spot during the next cycle of said cyclic multicast session.

19. The method of claim 18, further comprised of a step of terminating said cyclic multicast session after the image file has been sent, when the second client machine has not signed on during the first cycle of said cyclic multicast session.

20. The method of claim 19, wherein said image file contains the contents of one of a floppy disk, a hard disk, and at least one logical partition of one of said floppy disk and said hard disk of said central server.

21. The method of claim 18, wherein said image file contains a plurality of data packets each representing a discrete segment of the contents of one of a floppy disk, a hard disk, and at least one logical partition of one of said floppy disk and said hard disk of said central server.

22. A method of asynchronously transferring an image file from a central data provider to one or more client machines connected to a computer network during a cyclic multicast session, said method comprising the steps of:

determining whether a first client machine has signed on said cyclic multicast session for delivery of an image file;

after the first client machine has signed on said cyclic multicast session, sending the image file, via said computer network, to the first client machine during a first transmission cycle of said cyclic multicast session;

permitting the first client machine to download the complete image file sent from the central data provider via said computer network during the first transmission cycle of said cyclic multicast session;

while the first client machine is downloading the image file during the first transmission cycle of said cyclic multicast session, determining whether a second client machine has signed on said cyclic multicast session for delivery of the image file;

when the second client machine has signed on said cyclic multicast session while the first client machine is downloading the image file during the first transmission cycle of said cyclic multicast session, sending only missing portions of the image file to the second client machine during a next transmission cycle of said cyclic multicast session shorter than the first transmission cycle; and permitting the second client machine to download said missing portions of the image file during the next transmission cycle shorter than the first transmission cycle of said cyclic multicast session.

23. The method of claim 22, further comprised of a step of terminating said cyclic multicast session after the image file has been sent, when the second client machine has not signed on during the first transmission cycle of said cyclic multicast session.

24. The method of claim 22, wherein said image file contains the contents of one of a floppy disk, a hard disk, and at least one logical partition of one of said floppy disk and said hard disk of said central server.

25. A computer program medium having computer readable program code means embodied therein for causing a computer system to perform a cyclic multicasting of an image file to one or more remote client machines over a computer network concurrently through the use of different, consecutive cycles of a single cyclic multicast session, with each cycle including transmission of at least a portion of said image file, wherein said cyclic multicasting of said image file to one or more client machines over said computer network during said single cyclic multicast session is personnel by:

determining whether a first client machine needs transmission of the image file over said computer network;

when the first client machine needs transmission of the image file over said computer network, determining whether the image file is in a transmission queue during a first transmission cycle of said single cyclic multicast session;

when the image file is in the transmission queue during said first transmission cycle, sending the image file to the first client machine over said computer network during said first transmission cycle and determining whether a second client machine needs transmission of the image file during said first transmission cycle over said computer network;

when the second client machine needs transmission of the image file over said computer network, determining whether the sending of the image file to the first client machine over said computer network is completed during said first transmission cycle of said single cyclic multicast session; and when the sending of the image file to the first client machine over said computer network is completed during said first transmission cycle, resending at least a portion of the image file to the second client machine over said computer network during a next, second transmission cycle of said single cyclic multicast session.

26. The computer program medium of claim 25, wherein said image file contains a plurality of data packets each representing a discrete segment of contents of one of a floppy disk, a hard disk, and at least one logical portion of said floppy disk or said hard disk.

27. A network system, comprising:

a plurality of client machines;

a computer network;

a central data provider configured to provide cyclic multicasting of an image file to one or more client machines over said computer network by:

determining whether a client machine has signed on a cyclic multicast session and requested for transmission of an image file over said computer network;

when the client machine has requested for transmission of the image file over said computer network, determining whether the image file is in a transmission queue for a current cycle of said cyclic multicast session;

when the image file is in the transmission queue, sending the image file to the client machine over said computer network during the current cycle of said cyclic multicast session and determining whether another client machine has requested for transmission of the image file during the current cycle of said cyclic multicast session over said computer network;

when another client machine has requested for transmission of the image file during the current cycle of said cyclic multicast session, determining whether the sending of the image file to the client machine over said computer network is completed during the current cycle of said cyclic multicast session; and when the sending of the image file to the client machine over said computer network is completed during the current cycle of said cyclic multicast session, resending at least missing portions of the image file to another client machine over said computer network during a next cycle of said cyclic multicast session.

28. The network system of claim 27, wherein said central data provider is further configured to enable the client machine to immediately download a full image file which is transmitted during the current cycle of said cyclic multicast session, and enable another client machine to immediately download the full image file which is transmitted during the next cycle of said cyclic multicast session.

29. The network system of claim 27, wherein said central data provider is further configured to terminate said cyclic multicast session after the image file has been sent, when another client machine has not signed on during the first cycle of said cyclic multicast session.

30. The network system of claim 27, wherein said image file contains the contents of one of a floppy disk, a hard disk, and at least one logical partition of one of said floppy disk and said hard disk of said central server.

31. The network system of claim 27, wherein said image file contains a computer file representing one of a software program and a system update information for system update over said computer network.

32. The network system of claim 27, wherein said image file contains a plurality of data packets each representing a discrete segment of the contents of one of a floppy disk, a hard disk, and at least one logical partition of said floppy disk or said hard disk.

* * * * *